Patented Jan. 28, 1936

2,029,073

UNITED STATES PATENT OFFICE 2,029,073

PRODUCTION OF SULPHONIC ACIDS

Richard Huttenlocher and Richard Hess, Frankfort-on-the-Main, Germany

No Drawing. Application April 17, 1933, Serial No. 666,545. In Germany April 18, 1932

9 Claims. (Cl. 260—159)

It is known to convert into esters, by treatment with sulphuric acid, substances which have alcoholic hydroxyl groups or unsaturated places in their molecules. Thus, for instance, sulphuric esters derived from the alcohols can be attained by the action of concentrated sulphuric acid upon the respective alcohols. In the same manner sulphuric acid esters can be formed by the conversion of unsaturated hydrocarbons with sulphuric acid. All these substances can again be split up extremely easily by being treated with dilute acid, a retransformation of oxide compounds then occurring. Said easy splitting-up is particularly disagreeable when sulphuric acid esters of higher molecular fatty compounds, such as used, for instance, in the textile, leather and other industries as wetting, purifying, emulsifying, dispersing and softening agents, are employed. With these purposes it is often necessary to work in baths with high hydrogen ion concentrations, and the saponification of the sulphuric acid esters then taking place entails soiling of the respective fabrics etc., the soiling becoming disagreeably perceptible in the further working of said fabrics etc.

It has been discovered that by converting certain substances which have in their molecules an alcoholic hydroxyl group, or unsaturated places capable of reaction with alkyl-disulphonic or alkyl-polysulphonic acids or with derivatives thereof condensation products can be obtained which are distinguished by their high stablity with respect to acids, form easily soluble lime salts and have distinct surface-activity properties.

Particularly suited for carrying out this condensation are, for instance, methane-disulphonic-acid, ethane-disulphonic-acid, propane-disulphonic acid, methyl-methane-disulphonic-acid, and the halogen and amino-derivatives of the same, furthermore, acetaldehyd-disulphonic-acid, acetone-trisulphonic-acid, and the like.

It has been proved to be suitable for the purpose in view to carry out the condensation of the alkyl-disulphonic or alkyl-poly-sulphonic-acids or of the derivatives of the same with organic substances which have a hydroxyl-group or an unsaturated place in the molecule in the presence of substances able to bind water; the conversion is particularly accelerated by an addition of anhydrous acids and derivatives of the same. The condensation can be carried out at low temperatures in a quiet manner. It has also proved to be advantageous to facilitate the conversion in some cases by working in the presence of organic solvents.

The condensation products thus obtained constitute valuable wetting, purifying, dispersing, foaming and softening means for the textile, leather and paper industries, as well as for similar industries, and they are suitable as additions to soaps, soap powders, washing agents and similar products.

The process of the present application has for its purpose the production of true sulphonic acids. Sulphuric acid esters cannot be produced at all, inasmuch as sulphuric acid is used not as a reaction component, but at most in small amounts as a condensation agent. Between the organic compounds with one hydroxyl group and the various alkyl di-sulphonic acids mentioned in the present specification, two reaction possibilities exist: an esterification with one of the two sulphonic acid groups may occur, whereby the other sulphonic acid group remains unaltered, so that a water-soluble body results, or a condensation with the alcoholic substance may occur by means of a group capable of reacting, which occurs in the molecule of the di-sulphonic acid. This is probably the case in the decomposition of alcohols by means of such di-or tri-sulphonic acids as still contain a carbonyl group. The reaction hereby takes place in accordance with the following diagram:

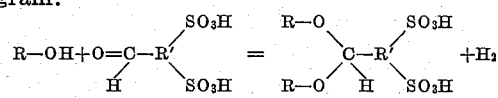

(here R designates any desired organic residue, and R' may be C·H or some other alkyl residue with three free valences.) Hereby sulphonic acids of acetals are produced.

Sulphonic acids which are suitable for the above transformations are mentioned above. From the compositions it is clear that, in addition to the unsubstituted alkyl di-sulphonic acids, their halogen and amino derivatives are suitable, but primarily also those which contain a carbonyl group in the molecule, as for example acetaldehyde di-sulphonic acid, and finally acetone tri-sulphonic acid. This enumeration is, however, not complete, for obviously alkyl di-sulphonic acids which contain an OH or SH group can also react in the described way with alcohols.

The invention will now be more fully explained with the aid of examples:

*Example 1.*—100 kg. of butyl-ricinoleate are treated with 150 kg. of methane-disulphonic-acid, the reaction being effected cold. After the usual working-up of the acid reaction mixture by neutralization with alkalies an oil is obtained which is soluble in water without impairing the clear appearance thereof, yields soluble lime salts, is also very stable with respect to dilute acids and shows a distinct wetting and emulsifying capacity.

Example 2.—100 kg. of dried potato starch are kneaded cold with 100 kg. of ethylene-disulphonic-acid until a specimen of the product is easily soluble in cold water and the solution is clear. The solution is neutralized with alkali, and after the neutral product has been dried in the vacuum, there is obtained a slightly yellow powder which is very easily soluble in cold water, is not hygroscopic, and has a strong affinity for fibres of all sorts, so that it can be used for the most varied dressing or finishing purposes.

Example 3.—100 kg. of methyl cyclohexanol are slowly and carefully treated in a stirring device, at about 50° C., with 200 kg. of dichlor ethane-disulphonic-acid, the treatment being continued until the reaction mass is soluble in water. After the neutralization, which is carried out in the usual manner, a paste of soap-like appearance is obtained which shows surface-activity properties.

Example 4.—100 kg. of hexadecenol are mixed with 100 kg. of amino-methane-disulphonic-acid at a temperature of from 30 to 40° C. The resulting reaction product is an excellent textile auxiliary agent which is distinguished especially by its extraordinarily great stability against acids and its emulsifying and wetting powers.

Example 5.—100 kg. duodecanol are carefully mixed, with energetic stirring, with 150 kg. of acetaldehyde-disulphonic-acid and care is taken that the reaction temperature does not rise above 35° C. It is advantageous to add to the duedecanol, prior to the addition of the other substance mentioned, a small amount of sulphuric acid, say about ½ kg. thereof. The reaction will be finished in about 4 hours, and after the neutralization has been carried out in the usual manner a water-soluble product is obtained which is very inert with respect to dilute acids and has a strong washing power.

Example 6.—100 kg. of hexadecenol are mixed with 30 kg. of acetic anhydride and are treated at 30° C. with 40 kg. of methane-disulphonic-acid until the product has become soluble in water. After the neutralization which is effected in known manner a light-colored paste is obtained which can be advantageously used for washing purposes and in the so-called avivage.

Example 7.—100 kg. of duodecanol are dissolved in 100 kg. of carbon tetrachloride and there are added 45 kg. of phosphorus-pentoxide, the substances being mixed with one another by stirring, at 30° C. The mixture is then treated at the same temperature with 160 kg. acetone-tri-sulphonic-acid until the reaction product has become soluble in water and the solution is clear. Now the product is diluted with a little ice water, it is separated from the precipitated acid and the product is finally neutralized in known manner. There is obtained a slightly yellow paste which is distinguished by its great wetting, purifying and dispersing power.

Example 8.—50 kg. of hexadecene are kneaded together with 80 kg. of methane-disulphonic-acid at 10° C. in the presence of 20 kg. of sulphuric acid until the reaction mass gives a clear solution. The sulpho-compound thus obtained constitutes, after the neutralization, a light-yellow paste which gives a clear solution in water and possesses excellent surface-activity properties; it can advantageously be used for the wetting and softening of textile fabrics.

Example 9.—50 kg. of undecanol are condensed with 50 kg. of amino-methane-disulphonic-acid at a temperature of between 20 and 30° C. The reaction mass is energetically agitated until it gives a clear solution in water and in dilute sulphuric acid. Then it is carefully neutralized by means of soda. There is obtained a yellowish-white powder which is excellently suited for the washing of wool, wool fabrics and felts, as well as for carbonization.

Example 10.—100 kg. of undecenol are stirred together with 70 kg. of acetaldehyde-disulphonic-acid and 25 kg. of sulphuric acid-monohydrate at 30° C. When the reaction mass gives a clear solution in water and in dilute acids it is carefully neutralized with soda. The mass must be well cooled while the neutralization is going on. The pulverulent product obtained constitutes an excellent wetting agent which is, besides, distinguished by its stability against acids and its great resistance against saponifying agents.

Example 11.—80 kg. of octadecenylamine are condensed together with 60 kg. of acetaldehyde-disulphonic-acid between 25 and 35° C. The reaction is assisted by the addition of 15 kg. of concentrated sulphuric acid. The yellowish-white powder obtained by direct neutralization is an excellent washing, purifying and dispersing agent.

We claim:

1. The process of preparing sulphonic acids which comprises reacting compounds containing alkyl-disulphonic acid radicles with organic compounds having alcoholic hydroxyl groups.

2. The process of preparing sulphonic acids which comprises reacting compounds containing alkyl-polysulphonic acid radicles with organic compounds having alcoholic hydroxyl groups.

3. The process of preparing sulphonic acids which comprises reacting substitution products of alkyl-disulphonic acids with organic compounds having alcoholic hydroxyl groups.

4. The process of preparing sulphonic acids which comprises reacting substitution products of alkyl-polysulphonic acids with organic compounds having alcoholic hydroxyl groups.

5. The process of preparing sulphonic acids which comprises reacting compounds containing alkyl-disulphonic acid radicles with organic compounds containing unsaturated reactive bonds in the molecule.

6. The process of preparing sulphonic acids which comprises reacting compounds containing alkyl-polysulphonic acid radicles with organic compounds containing unsaturated reactive bonds in the molecule.

7. The process of preparing sulphonic acids which comprises reacting substitution products of alkyl-disulphonic acids with organic compounds containing unsaturated reactive bonds in the molecule.

8. The process of preparing sulphonic acids which comprises reacting substitution products of alkyl-polysulphonic acids with organic compounds containing unsaturated reactive bonds in the molecule.

9. The process of preparing a sulphonic acid which comprises condensing acetaldehyde disulphonic acid with an alcohol.

RICHARD HUTTENLOCHER.
RICHARD HESS.